United States Patent
Eleveld et al.

(10) Patent No.: US 7,300,993 B2
(45) Date of Patent: Nov. 27, 2007

(54) PROCESS FOR THE PREPARATION OF POLYETHER POLYOLS

(75) Inventors: Michiel Barend Eleveld, Amsterdam (NL); Jan Hermen Hendrik Meurs, Amsterdam (NL); Peter Alexander Schut, Amsterdam (NL)

(73) Assignee: Shell Oil Company, Houston, TX (US)

( * ) Notice: Subject to any disclaimer, the term of this patent is extended or adjusted under 35 U.S.C. 154(b) by 335 days.

(21) Appl. No.: 11/141,916

(22) Filed: Jun. 1, 2005

(65) Prior Publication Data

US 2005/0272912 A1    Dec. 8, 2005

(30) Foreign Application Priority Data

Jun. 3, 2004    (EP)    ................. 04253302

(51) Int. Cl.
*C08F 16/12* (2006.01)
*C08F 16/20* (2006.01)

(52) U.S. Cl. ............... 526/332; 526/88; 526/89; 526/92; 526/180; 526/209; 526/210; 526/233; 526/266; 526/273; 526/333; 522/28; 522/29; 522/38; 522/64; 522/81; 522/100; 522/178; 522/181

(58) Field of Classification Search ......... 526/332, 526/333, 88, 89, 92, 180, 209, 210, 233, 526/266, 273; 522/28, 29, 38, 64, 81, 100, 522/178, 181
See application file for complete search history.

(56) References Cited

U.S. PATENT DOCUMENTS

| | | | |
|---|---|---|---|
| 2,372,244 A | 3/1945 | Adams et al. | ............ 260/461 |
| 2,830,069 A | 4/1958 | Smith, Jr. et al. | ............ 260/461 |
| 2,909,559 A | 10/1959 | Lanham et al. | ............ 260/461 |
| 3,278,487 A * | 10/1966 | Jack | ............ 525/326.6 |
| 3,404,109 A * | 10/1968 | Milgrom | ............ 568/607 |
| 3,417,164 A * | 12/1968 | Patton, Jr. et al. | ............ 558/165 |
| 3,639,542 A * | 2/1972 | Pizzini et al. | ............ 558/105 |
| 3,639,543 A | 2/1972 | Newton et al. | ............ 260/953 |
| 3,941,849 A * | 3/1976 | Herold | ............ 528/92 |
| 5,145,883 A * | 9/1992 | Saito et al. | ............ 521/172 |
| 5,223,583 A * | 6/1993 | Higuchi et al. | ............ 525/404 |
| 5,777,175 A * | 7/1998 | Ohkubo et al. | ............ 568/619 |
| 6,156,864 A * | 12/2000 | Ohkubo et al. | ............ 528/66 |
| 6,468,939 B1 | 10/2002 | Ooms et al. | ............ 502/162 |
| 6,586,566 B1 * | 7/2003 | Hofmann et al. | ............ 528/425 |
| 6,595,842 B2 * | 7/2003 | Misiura | ............ 451/528 |
| 6,852,663 B2 * | 2/2005 | Ooms et al. | ............ 502/175 |
| 6,852,664 B2 * | 2/2005 | Ooms et al. | ............ 502/175 |
| 6,919,293 B1 * | 7/2005 | Ooms et al. | ............ 502/175 |
| 6,919,486 B2 * | 7/2005 | Dexheimer | ............ 568/620 |
| 2005/0267279 A1 * | 12/2005 | Suzuki et al. | ............ 528/76 |

FOREIGN PATENT DOCUMENTS

| | | |
|---|---|---|
| EP | 90444 | 10/1983 |
| EP | 90445 | 10/1983 |
| GB | 1059506 | 2/1967 |
| JP | 4-145123 | 5/1992 |
| WO | 01/72418 | 10/2001 |

* cited by examiner

Primary Examiner—Sanza L. McClendon

(57) ABSTRACT

The invention relates to a process for the preparation of polyether polyols, which process involves:
(a) contacting a phosphorus containing compound having at least one hydroxyl group with alkylene oxide to obtain alkoxylated initiator,
(b) contacting the alkoxylated initiator with further alkylene oxide in the presence of a double metal cyanide complex catalyst.

15 Claims, No Drawings

PROCESS FOR THE PREPARATION OF POLYETHER POLYOLS

CLAIM TO PRIORITY

This application claims the benefit under 35 USC §119(a) of EP 04253302.6 filed Jun. 3, 2004.

FIELD OF THE INVENTION

The present invention relates to a process for the preparation of polyether polyols.

BACKGROUND OF THE INVENTION

Poly(alkylene oxide) polymers, also referred to as polyether polyols, may be obtained by processes comprising contacting initiator with alkylene oxide in the presence of a catalyst. The alkylene oxide can in principle be any alkylene oxide such as ethylene oxide, propylene oxide and butylene oxide. However, the alkylene oxides most frequently used commercially are propylene oxide and ethylene oxide. Conventionally, basic catalysts like potassium hydroxide are used in the preparation of polyoxyalkylene polyether products. However, double metal cyanide (DMC) catalysts have been found to be especially advantageous in the continuous preparation of alkylene oxide reaction products.

DMC catalysts generally require an induction period before the catalyst becomes active. In this induction period, the catalyst is mixed with initiator while traces of water and air are removed. The catalyst is considered to be activated if there is a noticeable pressure drop following initial introduction of alkylene oxide. Following activation, polymerization proceeds rapidly when additional alkylene oxide is added. Preactivated catalyst/initiator mixtures may be stored for later use provided that care is taken to exclude moisture, oxygen, etc. Low molecular weight initiators tend to have lengthy induction periods, and in some cases, with low molecular weight initiators such as water, ethylene glycol and propylene glycol, the DMC catalyst may not become activated, or is temporarily activated followed by deactivation.

Once activated, low molecular weight initiator tends to be less efficient with DMC catalysts. Propylene glycol and water, for example, often oxyalkylate very sluggishly, and sometimes deactivate the DMC catalyst. For this reason, higher molecular weight initiators, for example those having molecular weights in the range of from 100 to 5000, are generally used. Such initiator may be prepared by traditional base catalysis. However, the basic catalyst must be scrupulously removed from these starters, as even traces of strong bases deactivate DMC catalysts.

It would be useful to prepare an alkoxylated initiator in such a way that it can be used as such in a DMC catalyzed process.

SUMMARY OF THE INVENTION

The present invention is directed to a process for the preparation of polyether polyols, which process comprises
(a) contacting initiator with alkylene oxide to obtain alkoxylated initiator,
(b) contacting the alkoxylated initiator with further alkylene oxide in the presence of a double metal cyanide complex catalyst, in which process the initiator is a phosphorus containing compound having at least one hydroxyl group.

DETAILED DISCUSSION OF THE INVENTION

We have found an alkoxylated initiator which may be used with DMC catalyst without further treatment.

In the process according to the present invention, the initiator is a phosphorus containing compound having at least one hydroxyl group. The compound may be added as such or may be formed in-situ. Generally, it is preferred to add the phosphorus containing compound as such to the process, rather than forming it in situ, for ease of operation.

In principle, any phosphorus containing compound having at least one hydroxyl group may be used. The choice of the compound to be used generally depends on further circumstances such as the functionality of the product which is desired. Examples of compounds which may be used are phosphoric acid, phosphonic acid, phosphinic acid, phosphorous acid, pyrophosphoric acid, tripolyphosporic acid, tetrapolyphosphoric acid, metaphosphoric acid, pyrophosphonic acid, esters of any of these compounds and/or further oligomers or polymers of these compounds.

The compounds which will generally be used in the process according to the present invention may be represented by the following formula (1):

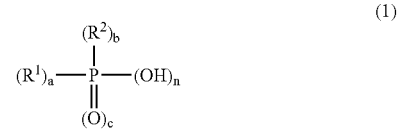

in which
n is from 1 to 3,
a is from 0 to 1,
b is from 0 to 1,
c is from 0 to 2,
$R^1$ is H, alkyl, alkoxylate or carboxylate, and
$R^2$ is H, alkyl, alkoxylate or carboxylate,
or an oligomer or polymer of the compound according to formula (1).

The value of a, b, c, and n each is calculated on basis of all compounds present. If a mixture of phosphorus containing compounds is present, these values represent the average of the compounds present.

It is generally preferred that the final polyether polyol has an average nominal functionality of at least 2. In order to manufacture such polyether polyol, the initiator from which the polyether polyol is manufactured must also have an average nominal functionality of at least 2. Therefore, it is preferred that n is at least 2. As it is often desirable that polyether polyols have an average nominal functionality of at most 3, it is preferred that n is at most 3. Therefore, it is preferred that n is from 2 to at most 3.

The groups $R^1$ and $R^2$ may each be any group such as H, alkyl, alkoxylate or carboxylate. Phosphorus compounds most widely available are compounds in which the groups $R^1$ and $R^2$ represent H.

The initiator most preferably is phosphorous acid, phosphoric acid, phosphonic acid and/or an oligomer thereof.

It has been found that the phosphorus containing compound can react with alkylene oxide in the absence of catalyst. Generally, this reaction proceeds at an acceptable rate if the temperature is from 0° C. to 200° C., more specifically from 20° C. to 180° C., most specifically from 40° C. to 150° C. The process is generally applied at a pressure which is atmospheric pressure or higher. Usually, the pressure will not exceed 20 bar. Preferably, the pressure is from 1 bar to 5 bar.

The molar ratio of alkylene oxide to phosphorus containing compound present in step (a) may vary within wide ranges. The molar ratio strongly depends on the molecular weight desired for the alkoxylated initiator. Generally, the alkoxylated initiator obtained will contain from 0.5 to 3 reacted alkylene oxide per hydroxyl group, more specifically from 1 to 2. Generally, the molecular weight of the alkoxylated initiator prepared in step (a) will be from 100 to 1,000, more specifically from 100 to 500, most specifically from 100 to 300.

Each of process step (a) and/or (b) may be carried out in the presence or in the absence of an inert solvent. Suitable inert solvents are heptane, cyclohexane, toluene, xylene, diethyl ether, dimethoxyethane and/or chlorinated hydrocarbon (such as methylene chloride, chloroform or 1,2-dichloro-propane). The solvent, if used, is generally used in an amount of from 10% to 30% by weight based on total amount of reaction mixture.

The reaction time of each process step (a) and (b) ranges from a few minutes to several days. Preferably, each process step takes from 1 hour to 10 hours.

The process may be carried out continuously, in a batch process or in a semi-batch process.

The alkylene oxide for use in step (a) and/or (b) of the process according to the present invention, may in principle be any alkylene oxide. The alkylene oxide may be any compound containing an epoxy group. Examples of suitable alkylene oxides are glycidol, glycidyl ethers, glycidyl esters and epichlorohydrin. Preferably, the alkylene oxide comprises from 2 to 100 carbon atoms, preferably from 2 to 10 carbon atoms, more preferably from 2 to 6 carbon atoms, more preferably from 2 to 4 carbon atoms. Preferred alkylene oxides for use in the present invention are ethylene oxide, propylene oxide, butene oxide, styrene oxide, epoxy resins, and mixtures thereof. For most applications, it is preferred that the alkylene oxide is propylene oxide and/or ethylene oxide.

Conventional initiators may also be present besides the phosphorus containing compound used in the present invention. A conventional initiator which may be present is glycerol. However, it is preferred that only phosphorus containing compounds according to the present invention are present.

The polyether polyol is prepared using a DMC catalyst. The molecular weight of the polyether polyol preferably is from 1000 to 100,000, more specifically from 1,000 to 50,000, more specifically from 2,000 to 20,000 and most specifically from 5,000 to 30,000.

Reactions of alkylene oxide in the presence of DMC catalyst generally comprise contacting starter and alkylene oxide in the presence of the DMC catalyst, for example, as described in EP-A-090444 and EP-A-090445. It has been found that in the present invention in principle any DMC catalyst may be used which is suitable for processes in which alkylene oxide is contacted with a starter.

Generally, DMC catalysts prepared according to the prior art and suitable for use in polymerization of alkylene oxides exhibit a powder x-ray diffraction pattern exhibiting no detectable signals corresponding to highly crystalline zinc hexacyano-cobaltate at about (d-spacing, angstroms) 5.07. More specifically, such DMC catalysts generally exhibit a powder x-ray diffraction pattern of (d-spacing, angstroms): 4.82 (br), 3.76 (br) and exhibits no detectable signals corresponding too highly crystalline zinc hexacyanocobaltate at about (d-spacing, angstroms): 5.07, 3.59, 2.54 and 2.28.

A process by which the DMC catalyst for use in the present invention may be prepared has been described in Japanese application 4-145123. The catalyst which may be prepared with this process is a bimetallic cyanide complex having tertiary butanol coordinated as organic ligand. The bimetallic cyanide complex catalyst may be prepared by mixing together aqueous solutions, or solutions in water and organic solvent mixtures, of a metal salt, preferably a salt of Zn(II) or Fe(II), and a polycyanometallate (salt), preferably containing Fe(III) or Co(III), and bringing tertiary butanol into contact with the bimetallic cyanide complex so obtained and removing the surplus solvent and tertiary butanol. In Reference Example 1, the surplus solvent and tertiary butanol are removed by suction filtration. The filter-cake obtained is washed with a 30% wt tertiary butanol aqueous solution and filtered, and this is repeated. The filter cake is dried at 40° C. under reduced pressure and then pulverized.

Another process by which the DMC catalyst may be prepared has been described in patent application WO 01/72418. The process described comprises the steps of:

(a) combining an aqueous solution of a metal salt with an aqueous solution of a metal cyanide salt and contacting these solutions, wherein at least part of this reaction takes place in the presence of an organic complexing agent, thereby forming a dispersion of a solid DMC complex in an aqueous medium;

(b) combining the dispersion obtained in step (a) with a liquid, which is essentially insoluble in water and which is capable of extracting the solid DMC complex formed in step (a) from the aqueous medium, and allowing a two-phase system to be formed consisting of a first aqueous layer and a layer containing the DMC complex and the liquid added;

(c) removing the first aqueous layer; and (d) recovering the DMC catalyst from the layer containing the DMC catalyst.

Process step (b) of the present invention may be carried out in so-called batch operation, semi-batch operation or continuous operation.

In batch operation, all compounds are added at the start of the reaction. In semi-batch operation, all compounds are present at the start of the reaction except the alkylene oxide. The alkylene oxide is added gradually. For both batch and semi-batch operation, alkoxylated initiator is to be used if DMC catalyst is to be applied. It is thought that DMC catalyst becomes inactive if the concentration of initiator which has not yet reacted with alkylene oxide is too high.

In continuous operation, alkoxylated initiator may be present while the process is started. However, initiator may be added during normal operation as the concentration of initiator is low in those circumstances. A preferred continuous operation comprises introducing alkoxylated initiator obtained in step (a) into a reaction vessel and bringing it to the desired reaction temperature, specifically from 40° C. to 150° C. It will be clear to someone skilled in the art that the reaction will proceed faster at higher temperature. Therefore, it is generally preferred to apply the higher side of this temperature range. The desired quantity of alkylene oxide may be subsequently dosed into the reaction vessel. The alkoxylated initiator may be combined with a DMC catalyst and further alkylene oxide added. Alkylene oxide optionally containing a small proportion of low molecular weight initiator such as water, glycerol or propylene glycol, may be added continuously to produce the desired polyether polyol. After completion of the alkylene oxide addition and a post-reaction time at a predetermined temperature, volatile constituents may be removed by distillation. Subsequently, any desired antioxidant may be added.

The polyether polyols which may be prepared by the process according to the present invention have been found suitable for applications that are well known in the art for conventional alkylene oxide reaction products, such as the use of polyoxyalkylene polyether in polyurethanes either in plastics, surfactants and/or foams. Therefore, the present invention further relates to a process comprising reacting a polyether polyol composition according to the present invention with a compound containing at least 2 isocyanate groups optionally in the presence of blowing agent. Such compositions may contain further conventional additives such as polyurethane catalysts, which may be gellation catalysts and/or blowing catalysts, fillers, flame retardants, foam stabilizers (surfactants) and colorants.

The present invention is hereinafter exemplified. The examples are meant to illustrate embodiments of the invention without limiting the invention to those specific embodiments.

EXAMPLE 1

A mechanically stirred reactor, immersed in a water bath, was charged with 10 grams of 85% wt phosphoric acid. Propylene oxide was added to the reactor until the temperature remained constant. The reaction mixture obtained was stripped with nitrogen giving 48.5 grams of clear and colorless alkoxylated initiator.

5 grams of the alkoxylated initiator was combined with 0.5 grams of the DMC catalyst dispersion prepared as described in Example 1 of WO-A-01/72418 with the difference that the propylene oxide adduct of glycerol had a number average molecular weight of 400 and that the final catalyst mixture contained 3% wt of DMC catalyst in polyether polyol. Further propylene oxide was added to the combination of alkoxylated initiator and DMC catalyst dispersion and the temperature increased. A highly viscous colorless product was obtained.

EXAMPLE 2

A 300 ml vessel was filled with 50 grams of 99% wt phosphoric acid, and was kept at 60° C. under a nitrogen atmosphere. While stirring, 199 grams (240 ml) of propylene oxide was added at a rate of 2 ml/minute. 137 grams of product was removed from the vessel. This product was combined with 2.8 grams of the DMC catalyst dispersion as used in Example 1. The temperature was raised to 120° C., and 12 grams (15 ml) of propylene oxide were added. After an induction time of about 6 hours, 125 grams (150 ml) was added at a rate of 1-2 ml/minute. When all propylene oxide had been added, 120 grams of polyol were removed. Subsequently, the above propylene oxide addition procedure was repeated 3 times, and a further 110, 117 and 163 grams of polyol were obtained, respectively. The weight average molecular weights of the latter products was determined by Gel Permeation Chromatography (GPC) and were found to be 1898, 3744 and 5911, respectively.

EXAMPLE 3

To a plastic bottle containing 50 grams of 99% wt phosphoric acid and 50 ml pentane, propylene oxide was added while stirring. The bottle was cooled in a water bath and the temperature was kept below 50° C. Propylene oxide was added until the addition of propylene oxide no longer resulted in an exotherm. Then, an additional 10 ml of propylene oxide was added and the reaction mixture was stirred overnight at ambient temperature. Subsequently, the mixture was heated to 90° C. and stripped with nitrogen to remove the pentane. 239 grams of crystal clear polyol was obtained.

A 1.25 liter reactor was charged with 119 grams of the above polyol and 8.01 grams of the DMC catalyst dispersion as used in Example 1. The reactor was stripped with nitrogen at reduced pressure to remove traces of water and heated to 130° C. A minor amount of about 9 grams of propylene oxide was fed to the reactor and the reactor pressure was monitored. Additional propylene oxide was added when an accelerated pressure drop was observed. The pressure drop indicates activation of the DMC catalyst. When the accelerated pressure drop was observed, additional propylene oxide and ethylene oxide were added gradually over 3 hours to obtain 785 grams of polyether polyol having an average molecular weight of 3000 and an ethylene oxide content of 12% wt. The product had a viscosity of 427 cSt at 40° C.

We claim:

1. A process for the preparation of polyether polyols, which process comprises:
   (a) contacting initiator with alkylene oxide to obtain alkoxylated initiator; and,
   (b) contacting the alkoxylated initiator with further alkylene oxide in the presence of a double metal cyanide complex catalyst,
   in which process the initiator is a phosphorus containing compound having at least one hydroxyl group.

2. The process of claim 1 wherein the product of step (a) has a number average molecular weight of from 100 to 1,000.

3. The process of claim 1 wherein the product of step (b) has a number average molecular weight of from 2,000 to 20,000.

4. The process of claim 1, in which process the initiator has a chemical formula according to formula (1)

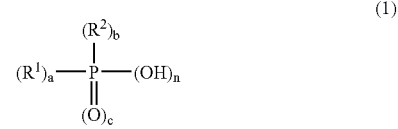

in which
n is from 1 to 3,
a is from 0 to 1,
b is from 0 to 1,
c is from 0 to 2,
$R^1$ is H, alkyl, alkoxylate or carboxylate, and
$R^2$ is H, alkyl, alkoxylate or carboxylate,
or an oligomer or polymer of a compound according to formula (1).

5. The process of claim 4 wherein the product of step (a) has a number average molecular weight of from 100 to 1,000.

6. The process of claim 4 wherein the product of step (b) has a number average molecular weight of from 2,000 to 20,000.

7. The process of claim 4 wherein in the initiator n is from 2 to at most 3.

8. The process of claim 7 wherein the product of step (a) has a number average molecular weight of from 100 to 1,000.

9. The process of claim 7 wherein the product of step (b) has a number average molecular weight of from 2,000 to 20,000.

10. The process of claim 4 wherein in the initiator $R^1$ and $R^2$ are H.

11. The process of claim 10 wherein the product of step (a) has a number average molecular weight of from 100 to 1,000.

12. The process of claim 10 wherein the product of step (b) has a number average molecular weight of from 2,000 to 20,000.

13. The process of claim 4 wherein the initiator is selected from the group consisting of phosphorous acid, phosphoric acid, phosphonic acid and/or an oligomer thereof.

14. The process of claim 13 wherein the product of step (a) has a number average molecular weight of from 100 to 1,000.

15. The process of claim 13 wherein the product of step (b) has a number average molecular weight of from 2,000 to 20,000.

* * * * *